(12) United States Patent
Watanabe et al.

(10) Patent No.: US 9,941,504 B2
(45) Date of Patent: Apr. 10, 2018

(54) ALL-SOLID-STATE ELECTRODE BODY AND ELECTROCHEMICAL CELL

(71) Applicants: SEIKO INSTRUMENTS INC., Chiba-shi, Chiba (JP); OHARA INC., Sagamihara-shi, Kanagawa (JP)

(72) Inventors: Shunji Watanabe, Chiba (JP); Tsuneaki Tamachi, Chiba (JP); Yoshimi Kanno, Chiba (JP); Kazumi Tanaka, Chiba (JP); Kazuhito Ogasa, Sagamihara (JP); Ryohei Sato, Sagamihara (JP)

(73) Assignees: SEIKO INSTRUMENTS INC., Chiba, Chiba (JP); OHARA INC., Sagamihara, Kanagawa (JP)

( * ) Notice: Subject to any disclaimer, the term of this patent is extended or adjusted under 35 U.S.C. 154(b) by 0 days.

(21) Appl. No.: 15/439,209

(22) Filed: Feb. 22, 2017

(65) Prior Publication Data
US 2017/0250393 A1    Aug. 31, 2017

(30) Foreign Application Priority Data
Feb. 25, 2016   (JP) .................................. 2016-034268

(51) Int. Cl.
| | | |
|---|---|---|
| H01M 10/052 | (2010.01) |
| H01M 2/26 | (2006.01) |
| H01M 10/0562 | (2010.01) |
| H01M 2/02 | (2006.01) |
| H01G 11/56 | (2013.01) |
| H01G 11/82 | (2013.01) |
| H01G 11/28 | (2013.01) |

(52) U.S. Cl.
CPC ............ *H01M 2/266* (2013.01); *H01G 11/28* (2013.01); *H01G 11/56* (2013.01); *H01G 11/82* (2013.01); *H01M 2/0275* (2013.01); *H01M 10/0562* (2013.01); *H01M 2300/0068* (2013.01)

(58) Field of Classification Search
CPC ........................... H01M 10/052; H01M 2/266
See application file for complete search history.

(56) References Cited

U.S. PATENT DOCUMENTS

2013/0309551 A1   11/2013   Ogasa

FOREIGN PATENT DOCUMENTS

JP   2013-243006 A   12/2013

*Primary Examiner* — Olatunji Godo
(74) *Attorney, Agent, or Firm* — Brinks Gilson & Lione (57) ABSTRACT

The present invention is an all-solid-state electrode body including: a positive electrode via that is formed in a negative electrode connection layer, and connects a plurality of a positive electrode connection layers adjacent to each other in a first direction; a negative electrode via that is formed in the positive electrode connection layer, and connects a plurality of the negative electrode connection layers adjacent to each other in the first direction; a positive electrode current collector layer which is exposed on a first surface that faces one side of the first direction in a stacked body, and is connected to the positive electrode connection layer via the positive electrode via; and a negative electrode current collector layer which is exposed on the first surface in the stacked body, and is connected to the negative electrode connection layer via the negative electrode via.

5 Claims, 2 Drawing Sheets

ALL-SOLID-STATE ELECTRODE BODY AND ELECTROCHEMICAL CELL

RELATED APPLICATIONS

Priority is claimed on Japanese Patent Application No. 2016-034268 filed on Feb. 25, 2016, the content of which is hereby incorporated by reference.

BACKGROUND OF THE INVENTION

1. Field of the Invention

The present invention relates to an all-solid-state electrode body and an electrochemical cell.

2. Description of the Related Art

With regard to an electrochemical cell (a secondary battery, a capacitor, and the like) which are used as a power supply of various kinds of devices, a configuration, which is provided with an electrode body and an exterior packaging body in which the electrode body is accommodated, is known.

For example, the exterior packaging body includes a first substrate, a second substrate, and a sealing member that joins the first substrate and the second substrate. The first substrate, the second substrate, and the sealing member partition a cavity in which the electrode body is accommodated.

The electrode body has a configuration in which a positive electrode layer and a negative electrode layer are alternatively stacked with an electrolyte interposed therebetween. The positive electrode layer includes a positive electrode current collector layer that is disposed at a first end in a stacking direction in the electrode body. The positive electrode current collector layer is conducted to an outer side via a conductive portion that is formed in one substrate of the above-described substrates.

The negative electrode layer includes a negative electrode current collector layer that is disposed at a second end in the stacking direction in the electrode body. The negative electrode current collector layer is conducted to an outer side via a conductive portion that is formed in the other substrate of the above-described substrates.

As the above-described electrode body, for example, as disclosed in Japanese Unexamined Patent Application, First Publication No. 2013-243006, a so-called all-solid-state electrode body, in which a positive electrode layer and a negative electrode layer are alternately stacked via a solid electrolyte, is known.

In the all-solid-state electrode body, there is no concern of leakage or depletion of the electrolyte, and the like differently from an electrode body that uses a liquid electrolyte or a polymer electrolyte, and thus the all-solid-state electrode body has an advantage that a long operational lifespan can be realized.

In an electrochemical cell that uses the all-solid-state electrode body, it is necessary to bring the conductive portions of respective substrates, and the positive electrode current collector layer and the negative electrode current collector layer of the electrode body into close contact with each other so as to secure conductivity. In this case, it is preferable that the positive electrode current collector layer is connected to the conductive portion of one substrate, for example, via a conductive adhesive, and the negative electrode current collector layer is connected to the conductive portion of the other substrate, for example, via a conductive adhesive.

However, in the configuration of the related art, it is difficult to respectively connect both of the positive electrode current collector layer and the negative electrode current collector layer to the conductive portions of the substrates via the adhesive and the like. Specifically, in the configuration of the related art, it is necessary to respectively connect the positive electrode current collector layer and the negative electrode current collector layer to different substrates at both ends in a stacking direction. According to this, when both of the positive electrode current collector layer and the negative electrode current collector layer are respectively connected to the conductive portions of the substrates with an adhesive, it is difficult to completely remove a solvent of the adhesive. In this case, the exterior packaging body is sealed in a state in which the solvent remains. As a result, there is a concern that battery characteristics may deteriorate due to the solvent that remains in a cavity.

The electrode body is expanded and contracted during charging and discharging. According to this, in a case where the electrode body is mounted in the substrates on both surfaces in the stacking direction, there is a concern that a great stress may act on the electrode body during charging.

An aspect of the invention has been made in consideration of the above-described situations, and an object thereof is to provide high-performance and high-reliability all-solid-state electrode body and electrochemical cell which maintain battery characteristics while securing conductivity.

SUMMARY OF THE INVENTION

To solve to the problem, the invention employs the following aspects.

(1) That is, according to an aspect of the invention, an all-solid-state electrode body includes: a stacked body in which a positive electrode connection layer and a negative electrode connection layer are alternately stacked in a first direction via a solid electrolyte; a positive electrode via which extends on an inner side of the stacked body in a first direction through a negative electrode escape portion that is formed in the negative electrode connection layer, and connects a plurality of the positive electrode connection layers adjacent to each other in the first direction; a negative electrode via which extends on an inner side of the stacked body in the first direction through a positive electrode escape portion that is formed in the positive electrode connection layer, and connects a plurality of the negative electrode connection layers adjacent to each other in the first direction; a positive electrode current collector layer which is exposed on a first surface that faces one side of the first direction in the stacked body, and is connected to the positive electrode connection layer via the positive electrode via; and a negative electrode current collector layer which is exposed on the first surface in the stacked body, and is connected to the negative electrode connection layer via the negative electrode via.

According to this aspect, in a case where the positive electrode current collector layer and the negative electrode current collector layer of the all-solid-state electrode body are respectively mounted in conductive portions of an exterior packaging body, it is possible to mount the positive electrode current collector layer and the negative electrode current collector layer on the same surface of the exterior packaging body. According to this, even when a conductive adhesive is interposed between the current collector layers and the conductive portions of the exterior packaging body so as to secure adhesiveness therebetween, it is possible to remove a solvent of the conductive adhesive before sealing the exterior packaging body. According to this, it is possible to suppress deterioration of battery characteristics due to the solvent of the conductive adhesive while securing conductivity between the current collector layers and the conductive portions of the exterior packaging body.

As a result, it is possible to maintain the battery characteristics while securing the conductivity.

Since the current collector layers are mounted on the same surface of the exterior packaging body, a stress that acts on the all-solid-state electrode body during charging and discharging is further mitigated in comparison to a case where the current collector layers are mounted on surfaces opposite to each other in the exterior packaging body, and thus it is possible to smoothly perform charging and discharging.

(2) In the aspect according to (1), a plurality of the positive electrode current collector layers and a plurality of the negative electrode current collector layers may be exposed on the first surface with an interval in an in-plane direction that is perpendicular to the first direction.

In this case, it is possible to reduce contact resistance between the current collector layers and the conductive portions of the exterior packaging body.

(3) According to another aspect of the invention, an electrochemical cell includes: the all-solid-state electrode body according to the aspect in (1) or (2); an exterior packaging body having a cavity in which the all-solid-state electrode body is accommodated; a positive electrode through-electrode which conducts an inner side and an outer side of the exterior packaging body and is exposed on a first inner surface, which faces the first surface of the all-solid-state electrode body in the first direction, in the exterior packaging body, and to which the positive electrode current collector layer is connected on the first inner surface; and a negative electrode through-electrode which conducts an inner side and an outer side of the exterior packaging body and is exposed on the first inner surface, and to which the negative electrode current collector layer is connected on the first inner surface.

According to this aspect, since the current collector layers of the all-solid-state electrode body according to the above-described aspect are respectively mounted in the through-electrodes on the first inner surface of the exterior packaging body, it is possible to provide a high-performance and high-reliability secondary battery.

(4) In the aspect according to (3), an insulating material may be disposed between a second surface that faces the other side of the first direction in the all-solid-state electrode body, and a second inner surface, which faces the second surface of the all-solid-state electrode body in the first direction, in the exterior packaging body.

In this case, it is possible to secure insulation between the second inner surface of the exterior packaging body, and the second surface of the all-solid-state electrode body. According to this, it is possible to realize an additional improvement in reliability.

(5) In the aspect according to (4), the insulating material may be configured to be elastically deformable, and may be disposed to come into close contact with the second surface of the all-solid-state electrode body and the second inner surface of the exterior packaging body.

In this case, it is possible to reduce a stress that acts between the all-solid-state electrode body and the exterior packaging body due to a difference between a coefficient of thermal expansion of the all-solid-state electrode body and a coefficient of thermal expansion of the exterior packaging body.

Furthermore, a volume variation of the all-solid-state electrode body in accordance with charging and discharging, or a tolerance of the all-solid-state electrode body and the exterior packaging body can be absorbed by elastic deformation of the insulating material. According to this, it is possible to suppress occurrences of cracking in the all-solid-state electrode body while securing insulation between the exterior packaging body and the all-solid-state electrode body.

According to the aspects in (1) to (5) of the invention, it is possible to provide high-performance and high-reliability all-solid-state electrode body and electrochemical cell which maintain battery characteristics while securing conductivity.

DETAILED DESCRIPTION OF THE PREFERRED EMBODIMENTS

Hereinafter, respective embodiments of the invention will be described with reference to the accompanying drawings. In the following description, as an electrochemical cell according to an aspect of the invention, a description will be provided of a secondary battery including an all-solid-state electrode body (hereinafter, referred to simply as "electrode body"). In the following drawings, the scales of respective members are appropriately changed so as to make the respective members have a recognizable size.

First Embodiment

Secondary Battery

Figure 1:
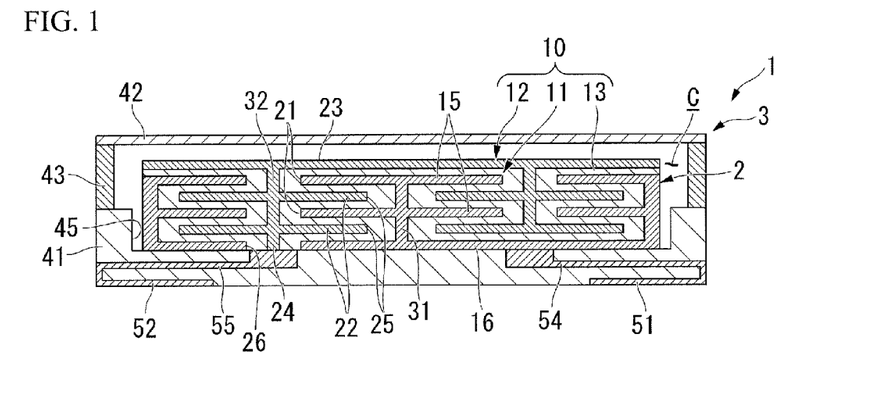
FIG. 1 is a cross-sectional view of a secondary battery according to a first embodiment of the invention.

FIG. 1 is a cross-sectional view of a secondary battery 1.

As shown in FIG. 1, the secondary battery 1 of this embodiment includes an electrode body 2, and an exterior packaging body 3 having a cavity C in which the electrode body 2 is accommodated.

Electrode Body

The electrode body 2 is a so-called all-solid-state electrode body 2. The electrode body 2 includes a stacked body 10 in which a positive electrode layer 11 and a negative electrode layer 12 are alternately stacked via a solid electrolyte layer 13.

The positive electrode layer 11 includes a positive electrode connection layer 15 and a positive electrode current collector layer 16.

The positive electrode connection layer 15 is disposed between a plurality of the solid electrolyte layers 13. The positive electrode current collector layer 16 constitutes a first end (the lowest layer) in a stacking direction (first direction) in the electrode body 2.

A positive electrode escape hole (positive electrode escape portion) 21, which passes through the positive electrode connection layer 15 in the stacking direction, is formed in the positive electrode connection layer 15. A plurality of the positive electrode escape holes 21 are formed with an interval in an in-plane direction that is perpendicular to the stacking direction. In a plurality of the positive electrode connection layers 15, the positive electrode escape holes 21 which correspond to each other overlap each other in a plan view seen in the stacking direction.

The positive electrode layer 11 contains a positive electrode active material, a solid electrolyte, a conductive auxiliary agent, and the like.

It is preferable It is preferable that the positive electrode active material is, for example, a NASICON-type $LiV_2(PO_4)_3$, an olivine-type $Li_xJ_yMtPO_4$ (provided that, J represents at least one or more kinds selected from Al, Mg, and W, Mt represents one or more kinds selected from Ni, Co, Fe, and Mn, $0.9 \leq x \leq 1.5$, $0 \leq y \leq 0.2$), a layer-shaped oxide, or a spinel-type oxide. Particularly, it is more preferable that the electrode active material is composed of $LiMtO_2$ and/or $LiMt_2O_4$ (provided that, Mt represents one or more kinds selected from Fe, Ni, Co, and Mn) among the above-described materials. According to this, the positive electrode active material is likely to intercalate lithium ions, and thus it is possible to further increase discharge capacity of the all-solid-state secondary battery 1. As a specific example of the positive electrode active material, for example, $LiCoPO_4$, $LiCoO_2$, and $LiMn_2O_4$ can be used.

As the solid electrolyte, lithium-ion conductive glass or crystal is appropriately used. Examples of the lithium-ion conductive crystal include crystals of oxides selected from a NASICON type, a $\beta$-$Fe_2(SO_4)_3$ type, and a perovskite type. More specific examples thereof include $Li_6BaLa_2Ta_2O_{12}$, LiN, $La_{0.55}Li_{0.35}TiO_3$, $Li_{1+x}Al_x(Ti, Ge)_{2-x}(PO_4)_3$, $LiTi_2P_3O_{12}$, $Li_{1.5}Al_{0.5}Ge_{1.5}(PO_4)_3$, $Li_{1+x+y}Zr_{2-x}(Al, Y)_xSi_yP_{3-y}O_{12}$ (provided that, $0.05 \leq x \leq 0.3$, $0.05 \leq y \leq 0.3$), and the like. Among these, particularly, $Li_{1+x+z}E_yG_{2-y}Si_zP_{3-y}O_{12}$ (provided that, j, x, y, and z satisfy relationships of $0 \leq x \leq 0.8$, $0 \leq z \leq 0.6$, $0 \leq y \leq 0.6$, E is one or more kinds selected from Al, Ga, Y, Sc, Ge, Mg, Ca, Ce, Sm, and G is one or more kinds selected from Ti and Zr) is preferable.

Examples of the lithium-ion conductive glass include amorphous or polycrystalline glass of a $LiPO_3$ base, a $70LiPO_3$-$30Li_3PO_4$ base, a $Li_2O$-$SiO_2$ base, and a $Li_2O$-$SiO_2$-$P_2O_5$-$B_2O_5$-$BaO$ base. Among these, particularly, one or more kinds selected from $Li_2O$-$P_2O_5$-based glass and $Li_2O$-$P_2O_5$-$M'_2O_3$-based glass (also including glass in which P is substituted with Si, and M' represents Al or B).

As the conductive auxiliary agent, carbon (acetylene black, activated charcoal, graphite, flake graphite, or a mixture thereof), a metal composed of at least one kinds of Ni, Fe, Mn, Co, Mo, Cr, Ag, and Cu, and an alloy thereof can be used. A metal such as titanium, stainless steel, and aluminum, and a noble metal such as platinum, silver, gold, and rhodium may be used. When using the material having high electron conductivity as the conductive auxiliary agent, the amount of currents capable of being conducted through a narrow electron conduction path, which is formed in the positive electrode layer 11, increases, and thus it is possible to form the secondary battery 1 with small internal resistance without using a current collector.

The negative electrode layer 12 includes a negative electrode connection layer 22, a negative electrode exposure layer 23, and a negative electrode current collector layer 24.

The negative electrode connection layer 22 is stacked on both sides of the positive electrode connection layer 15 in the stacking direction via the solid electrolyte layer 13. A negative electrode escape hole (negative electrode escape portion) 25, which passes through the negative electrode connection layer 22 in the stacking direction, is formed in the negative electrode connection layer 22. A plurality of the negative electrode escape holes 25 are formed with an interval in the above-described in-plane direction. In a plurality of the negative electrode connection layers 22, the negative electrode escape holes 25 which correspond to each other overlap each other in a plan view seen in the stacking direction.

The negative electrode exposure layer 23 is exposed at a second end (uppermost layer) of the electrode body 2 in the stacking direction. The negative electrode current collector layer 24 is exposed at the first end in the stacking direction in the electrode body 2.

In this embodiment, each of the positive electrode escape holes 21 of the positive electrode connection layer 15, and each of the negative electrode escape holes 25 of the negative electrode connection layer 22 are set to have approximately the same inner diameter as each other. The positive electrode escape hole 21 of the positive electrode connection layer 15 and the negative electrode escape hole 25 of the negative electrode connection layer 22 are disposed at positions which do not overlap each other in a plan view seen in the stacking direction. In the following description, a first end side and a second end side of the electrode body 2 in the stacking direction may be referred to as a downward side and an upward side, respectively.

The negative electrode layer 12 contains a negative electrode active material, the solid electrolyte, the conductive auxiliary agent, and the like.

It is preferable that the negative electrode active material is at least one kind selected from an oxide including crystals of a NASICON-type, an olivine type, and a spinel type, a rutile-type oxide, an anatase-type oxide, an amorphous metal oxide, a metal alloy, and the like. Particularly, it is more preferable that the negative electrode active material is composed of $Li_{1+x+z}Al_yTi_2Si_zP_{3-z}O_{12}$ (provided that, x, y, and z satisfy relationships of $0 \leq x \leq 0.8$, $0 \leq z \leq 0.6$, and $0 \leq y \leq 0.6$) $Li_4Ti_5O_{12}$, and $TiO_2$ among the above-described materials. According to this, the negative electrode active material is likely to intercalate lithium ions, and thus it is possible to further increase discharge capacity of the secondary battery 1. As a specific example of the negative electrode active material, for example, $Li_2V_2(PO_4)_3$, $Li_2Fe_2(PO_4)_3$, $LiFePO_4$, $Li_4Ti_5O_{12}$, $SiO_x (0.25 \leq x \leq 2)$, and $Cu_6Sn_5$ can be used.

The solid electrolyte layer 13 is interposed between the positive electrode layer 11 and the negative electrode layer 12 to isolate the positive electrode layer 11 and the negative electrode layer 12 from each other. The solid electrolyte layer 13 of this embodiment is also formed in the escape holes 21 and 25 of the connection layers 15 and 22.

Here, an exposure hole 26, which passes through the positive electrode current collector layer 16 in the stacking direction, is formed in the positive electrode current collector layer 16. The exposure hole 26 overlaps any one of the above-described positive electrode escape holes 21 in a plan view seen in the stacking direction.

The negative electrode current collector layer 24 is disposed in the exposure hole 26. An external shape of the negative electrode current collector layer 24 in a plan view is smaller than that of the exposure hole 26. The negative electrode current collector layer 24 is isolated from the positive electrode current collector layer 16 via the solid electrolyte layer 13 in the exposure hole 26. Accordingly, the current collector layers 16 and 24 of this embodiment are exposed on a lower surface (first surface) of the electrode body 2.

The electrode body 2 includes a positive electrode via 31 that connects a plurality of the positive electrode layers 11 (the positive electrode connection layer 15 and the positive electrode current collector layer 16) in parallel with each other, and a negative electrode via 32 that connects a plurality of the negative electrode layers 12 (the negative electrode connection layers 22, the negative electrode exposure layers 23, and the negative electrode current collector layers 24) in parallel with each other.

The positive electrode via 31 extends along the stacking direction of the electrode body 2. The positive electrode via 31 connects the positive electrode connection layers 15 and the positive electrode current collector layer 16 to each other through the negative electrode escape hole 25. An outer diameter of the positive electrode via 31 is set to be smaller than the inner diameter of the negative electrode escape hole 25. Accordingly, the positive electrode via 31 is isolated from the negative electrode connection layer 22 via the solid electrolyte layer 13 in the negative electrode escape hole 25.

The negative electrode via 32 extends along the stacking direction of the electrode body 2. The negative electrode via 32 connects the negative electrode connection layers 22, the negative electrode exposure layer 23, and the negative electrode current collector layer 24 to each other through the positive electrode escape hole 21. An outer diameter of the negative electrode via 32 is set to be smaller than the inner diameter of the positive electrode escape hole 21. Accordingly, the negative electrode via 32 is isolated from the positive electrode connection layer 15 via the solid electrolyte layer 13 in the positive electrode escape hole 21. The positive electrode escape hole 21 is not limited to a hole as long as the negative electrode via 32 can pass therethrough, and may be a notch and the like. The negative electrode escape hole 25 is not limited to a hole as long as the positive electrode via 31 can pass therethrough, and may be a notch and the like.

Exterior Packaging Body

The exterior packaging body 3 includes a base substrate 41 and a lid substrate 42 which are respectively disposed on both sides of the electrode body 2 in the stacking direction, and a seal ring 43 that joins the substrates 41 and 42 to each other. The shape of the exterior packaging body 3 in a plan view can be approximately changed among a rectangular shape, a circular shape, and the like.

For example, the base substrate 41 is formed from a ceramic material (alumina and the like). The base substrate 41 is formed in a box shape having a concave portion 45 that is opened toward an upward side. A pair of external electrodes (a positive electrode external electrode 51 and a negative electrode external electrode 52) is formed on a lower surface of the base substrate 41. The external electrodes 51 and 52 are disposed to be spaced away from each other on the lower surface of the base substrate 41.

A positive electrode through-electrode 54 and a negative electrode through-electrode 55, which conduct an inner side and an outer side of the exterior packaging body 3 to each other, are provided in the base substrate 41.

The positive electrode through-electrode 54 penetrates through the base substrate 41 in the stacking direction. An upper end surface of the positive electrode through-electrode 54 is exposed on a bottom surface (first inner surface) of the concave portion 45 in the base substrate 41. A lower end of the positive electrode through-electrode 54 is connected to the positive electrode external electrode 51.

The negative electrode through-electrode 55 penetrates through the base substrate 41 in the stacking direction. An upper end surface of the negative electrode through-electrode 55 is exposed on the bottom surface of the concave portion 45 in the base substrate 41. A lower end of the negative electrode through-electrode 55 is connected to the negative electrode external electrode 52. It is preferable that the above-described current collector layers 16 and 24 have an outer diameter that is greater than that of portions, which are exposed on the bottom surface of the concave portion 45, of the through-electrodes 54 and 55.

The above-described electrode body 2 is accommodated in the concave portion 45 of the base substrate 41 in a state in which the current collector layers 16 and 24 face a downward side. In the electrode body 2, the positive electrode current collector layer 16 is mounted on the positive electrode through-electrode 54 via a conductive adhesive (not shown) and the like on the bottom surface of the concave portion 45. In the electrode body 2, the negative electrode current collector layer 24 is mounted on the negative electrode through-electrode 55 via a conductive adhesive (not shown) and the like on the bottom surface of the concave portion 45. That is, in the electrode body 2 of this embodiment, the current collector layers 16 and 24 are respectively mounted on the through-electrodes 54 and 55, which correspond to the current collector layers 16 and 24, on the same surface (the lower surface of the electrode body 2). For example, the conductive adhesive has a configuration in which conductive particles are blended in a thermosetting resin.

The seal ring 43 is formed in a frame shape that surrounds the periphery of the electrode body 2. A lower surface of the seal ring 43 is joined to an upper surface of the base substrate 41. Specifically, the seal ring 43 is joined onto the base substrate 41 through baking of a brazing material such as a silver solder, a soldering material, and the like.

Examples of a material of the seal ring 43 include a nickel-based alloy and the like. Specifically, the material may be selected from kovar, elinvar, invar, 42-alloy, and the like. Particularly, as the material of the seal ring 43, it is preferable to select a material of which a coefficient of thermal expansion is close to that of the base substrate 41 fat med from a ceramic material. For example, in a case of using alumina having a coefficient of thermal expansion of $6.8 \times 10^{-6}/°$ C. as the base substrate 41, it is preferable to use kovar having a coefficient of thermal expansion of $5.2 \times 10^{-6}/°$ C. or 42-alloy having a coefficient of thermal expansion of $4.5 \times 10^{-6}/°$ C. to $6.5 \times 10^{-6}/°$ C. as the seal ring 43.

The lid substrate 42 is formed from a material (for example, kovar and the like) of which a coefficient of thermal expansion is close to that of the base substrate 41 or the seal ring 43. The lid substrate 42 is formed in a flat plate shape having an external shape that is approximately the same as that of the base substrate 41 in a plan view seen from the stacking direction. The lid substrate 42 is joined onto the seal ring 43. According to this, the lid substrate 42 air-tightly seals the concave portion 45 of the base substrate 41. A space, which is partitioned by the base substrate 41, the lid substrate 42, and the seal ring 43, constitutes an air-tightly sealed cavity C. The lid substrate 42 may be formed from a ceramic material.

Method of Manufacturing Secondary Battery

Next, a description will be provided of a method of manufacturing the above-described secondary battery 1.

The method of manufacturing the secondary battery 1 in this embodiment includes an electrode body forming process, and a sealing process of sealing the electrode body 2 with the exterior packaging body 3.

Electrode Body Forming Process

The electrode body forming process mainly includes a positive electrode sheet preparing process, a negative electrode sheet preparing process, a stacking process, and a hot pressing process.

Positive Electrode Sheet Preparing Process

In the positive electrode sheet preparing process, a raw material composition of the positive electrode layer 11 is applied onto a base material to form a positive electrode green sheet. In the positive electrode green sheet, the positive electrode escape hole 21 is formed in a positive electrode green sheet that becomes the positive electrode connection layer 15. In the positive electrode green sheet that becomes the positive electrode connection layer 15, a raw material composition of the solid electrolyte layer 13 is applied to a region except for a portion corresponding to the negative electrode escape hole 25 of the negative electrode green sheet. In the positive electrode green sheet, the exposure hole 26 is formed in a positive electrode green sheet that becomes the positive electrode current collector layer 16. In the positive electrode green sheet that becomes the positive electrode current collector layer 16, the raw material composition of the solid electrolyte layer 13 is applied to a region except for a portion corresponding to the negative electrode escape hole 25 of the negative electrode green sheet. The above-described green sheet represents a glass powder formed in a thin plate shape, and a non-baked body of a crystal (ceramic or glass ceramic) powder. Specifically, the green sheet in this embodiment represents a member obtained by mixing a raw material composition of the electrode layers (the positive electrode layer 11 and the negative electrode layer 12) or the solid electrolyte layer 13 in an organic binder, a solvent, and the like into a slurry or paste shape, and by molding the resultant slurry or paste-shaped mixture into a thin plate shape. The green sheet in this embodiment also includes a different green sheet, or a member in which the raw material composition is applied to a baked body of the different green sheet.

Negative Electrode Sheet Preparing Process

In the negative electrode sheet preparing process, a raw material composition of the negative electrode layer 12 is applied onto a base material to form a negative electrode green sheet. In the negative electrode green sheet, the negative electrode escape hole 25 is formed in a negative electrode green sheet that becomes the negative electrode connection layer 22. In the negative electrode green sheet that becomes the negative electrode connection layer 22, the raw material composition of the solid electrolyte layer 13 is applied to a region except for a portion corresponding to the positive electrode escape hole 21 of the positive electrode green sheet.

Stacking Process

In the stacking process, the positive electrode sheet that is prepared in the positive electrode sheet preparing process, and the negative electrode sheet that is prepared in the negative electrode sheet preparing process are stacked. At this time, the positive electrode sheet that becomes the positive electrode connection layer 15, and the negative electrode sheet that becomes the negative electrode connection layer 22 are alternately stacked in such a manner that the positive electrode escape holes 21 overlap each other in the stacking direction, and the negative electrode escape holes 25 overlap each other in the stacking direction. The positive electrode sheet, which becomes the positive electrode current collector layer 16, is located in the lowest layer in the stacking direction, and is stacked in such a manner that the exposure hole 26 and corresponding positive electrode escape holes 21 of the positive electrode connection layer 15 overlap each other in the stacking direction.

Degreasing Process

Next, the following degreasing process is performed. In the degreasing process, a sheet stacked body, which is prepared in the stacking process and is constituted by the positive electrode sheet and the negative electrode sheet, is heated to gasify and remove an organic binder component that is contained in the sheet stacked body. According to this, carbon, which remains in the solid electrolyte after the hot pressing process, is reduced, and thus it is possible to prevent short-circuiting (electron conduction in the solid electrolyte).

Hot Pressing Process

In the hot pressing process, the sheet stacked body is heated while being compressed in the stacking direction to bake the sheet stacked body. In this case, in the sheet stacked body, the positive electrode sheets, which are adjacent to each other with the negative electrode sheet interposed therebetween, come into contact with each other through the negative electrode escape hole 25 in the stacking direction. In the sheet stacked body, the negative electrode sheets, which are adjacent to each other with the positive electrode sheet interposed therebetween, come into contact with each other through the positive electrode escape hole 21 of the positive electrode connection layer 15 in the stacking direction. That is, in the positive electrode sheets, a portion, which connects the positive electrode sheets adjacent to each other through the inside of the negative electrode escape hole 25, becomes the positive electrode via 31. In the negative electrode sheets, a portion, which connects the negative electrode sheets adjacent to each other through the inside of the positive electrode escape hole 21, becomes the negative electrode via 32.

In the sheet stacked body, a negative electrode sheet, which is located on the most downward side, is exposed to a lower surface through the exposure hole 26 of the positive electrode current collector layer 16. That is, in the negative electrode sheets, a portion, which is exposed to the lower surface of the sheet stacked body through the exposure hole 26, becomes the negative electrode current collector layer 24.

Through the processes, the above-described electrode body 2 is obtained.

Sealing Process

In the sealing process, for example, a conductive adhesive (not shown) is applied onto the base substrate 41, and the electrode body 2 is set in the concave portion 45 of the base substrate 41. At this time, the electrode body 2 is set in such a manner that the positive electrode current collector layer 16 is disposed on the positive electrode through-electrode 54, and the negative electrode current collector layer 24 is disposed on the negative electrode through-electrode 55 in a state in which the current collector layers 16 and 24 face a downward side. Then, the conductive adhesive is dried to preliminary compress the electrode body 2.

Subsequently, the lid substrate 42 is superimposed on the seal ring 43. Then, the seal ring 43 and the lid substrate 42 are joined to each other through resistive seam welding, laser seam welding, and the like. According to this, the electrode body 2 is air-tightly sealed in the cavity C that is partitioned by the substrates 41 and 42, and the seal ring 43, thereby completing the secondary battery 1. Furthermore, the joining between the lid substrate 42 and the seal ring 43 may be performed through soldering, brazing, laser welding, and the like without limitation to the seam welding.

As described above, in this embodiment, the positive electrode current collector layer 16 and the negative electrode current collector layer 24 are configured to be exposed on the lower surface of the electrode body 2.

According to this configuration, in a case of mounting the electrode body 2 in the exterior packaging body 3, it is possible to mount the positive electrode current collector layer 16 and the negative electrode current collector layer 24 on the same surface of the exterior packaging body 3. According to this, even when the conductive adhesive is interposed between the positive electrode current collector layer 16 and the positive electrode through-electrode 54 and between the negative electrode current collector layer 24 and the negative electrode through-electrode 55 so as to secure adhesiveness between the positive electrode current collector layer 16 and the positive electrode through-electrode 54 and adhesiveness between the negative electrode current collector layer 24 and the negative electrode through-electrode 55, it is possible to remove the solvent of the conductive adhesive before sealing of the exterior packaging body 3. According to this, it is possible to suppress deterioration of battery characteristics due to the solvent of the conductive adhesive while securing conductivity between the positive electrode current collector layer 16 and the positive electrode through-electrode 54, and conductivity between the negative electrode current collector layer 24 and the negative electrode through-electrode 55.

As a result, it is possible to maintain the battery characteristics while securing the conductivity.

Since the current collector layers 16 and 24 are mounted on the same surface of the exterior packaging body 3, it is possible to further mitigate a stress that occurs in the electrode body 2 during charging and discharging in comparison to a case of mounting the current collector layers 16 and 24 on surfaces which are opposite to each other in the exterior packaging body 3. As a result, it is possible to smoothly perform charging and discharging.

In addition, in the secondary battery 1 of this embodiment, the positive electrode current collector layer 16 of the electrode body 2 is mounted on the positive electrode through-electrode 54 that is exposed on the bottom surface of the concave portion 45 in the base substrate 41. The negative electrode current collector layer 24 is mounted on the negative electrode through-electrode 55 that is exposed on the bottom surface of the concave portion 45 in the base substrate 41. According to this, it is possible to provide high-performance and high-reliability secondary battery 1.

In the above-described embodiment, a description has been provided of a configuration in which the negative electrode current collector layer 24 is exposed at one site on the lower surface of the electrode body 2, but there is no limitation thereto. The layout of the current collector layers 16 and 24 on the lower surface of the electrode body 2 may be approximately changed. In this case, a plurality of the current collector layers 16 and 24 may be exposed with an interval in an in-plane direction. The external shape of the current collector layers 16 and 24 in a plan view may be greater than the external shape of the through-electrodes 54 and 55 in a plan view on the bottom surface of the concave portion 45.

According to this configuration, it is possible to reduce contact resistance between the positive electrode current collector layer 16 and the positive electrode through-electrode 54, and contact resistance between the negative electrode current collector layer 24 and the negative electrode through-electrode 55.

Second Embodiment

Figure 2:
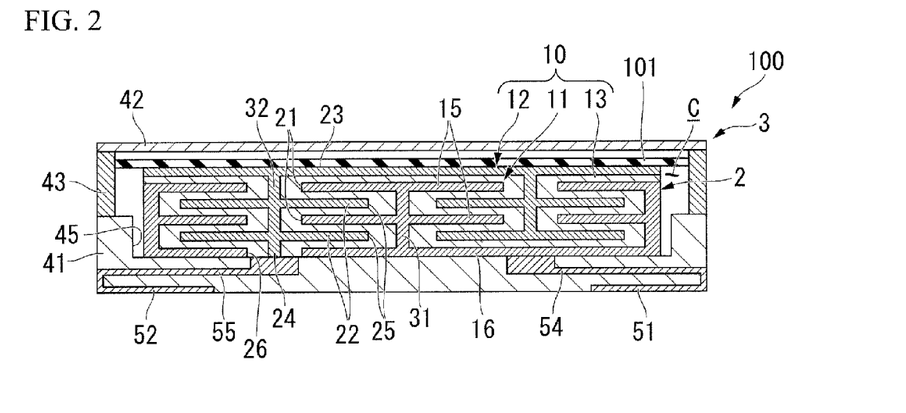
FIG. 2 is a view showing a secondary battery according to a second embodiment of the invention as a cross-sectional view corresponding to FIG. 1.

Next, a second embodiment of the invention will be described. FIG. 2 is a view showing a secondary battery 100 of the second embodiment, and is a cross-sectional view corresponding to FIG. 1. This embodiment is different from the above-described embodiment in that an insulating material 101 is interposed between the electrode body 2 and the lid substrate 42.

In the secondary battery 100 shown in FIG. 2, the insulating material 101 is disposed to cover the upper surface (second surface) of the electrode body 2 from an upward side. An external shape of the insulating material 101 in a plan view seen from the stacking direction is set to be greater than that of the electrode body 2. In this embodiment, an outer peripheral edge of the insulating material 101 is disposed at a position that is close to or comes into contact with an inner peripheral surface of the seal ring 43. In an example in FIG. 2, an upper surface of the insulating material 101 is located on a downward side of an upper surface of the seal ring 43. According to this, a gap is provided between the upper surface of the insulating material 101 and a lower surface (second inner surface) of the lid substrate 42. However, the insulating material 101 may be provided without the gap between the upper surface of the electrode body 2 and the lower surface of the lid substrate 42. The insulating material 101 may be disposed on the lower surface of the lid substrate 42.

As the insulating material 101, a non-woven sheet formed from glass fiber and the like, and a heat-resistant resin (for example, polyimide and the like) can be used. In this case, it is preferable that the melting point of the insulating material 101 is set to be higher than heat that occurs during sealing of the exterior packaging body 3 or during mounting of the secondary battery 100.

According to this embodiment, it is possible to exhibit the same effect as in the first embodiment, and it is possible to secure insulation between the lid substrate 42 and the electrode body 2. As a result, it is possible to realize an additional improvement in the reliability.

It is possible to reduce the gap between the seal ring 43 and the insulating material 101 in an in-plane direction by making the external shape of the insulating material 101 in a plan view greater than that of the electrode body 2. According to this, it is possible to suppress scattering of fume and the like, which occur during joining between the seal ring 43 and the lid substrate 42, toward the electrode body 2 through the gap between the seal ring 43 and the insulating material 101. According to this, it is possible to suppress short-circuiting of the electrode body 2 due to attachment of the fume and the like to the electrode body 2.

MODIFICATION EXAMPLE

Figure 3:
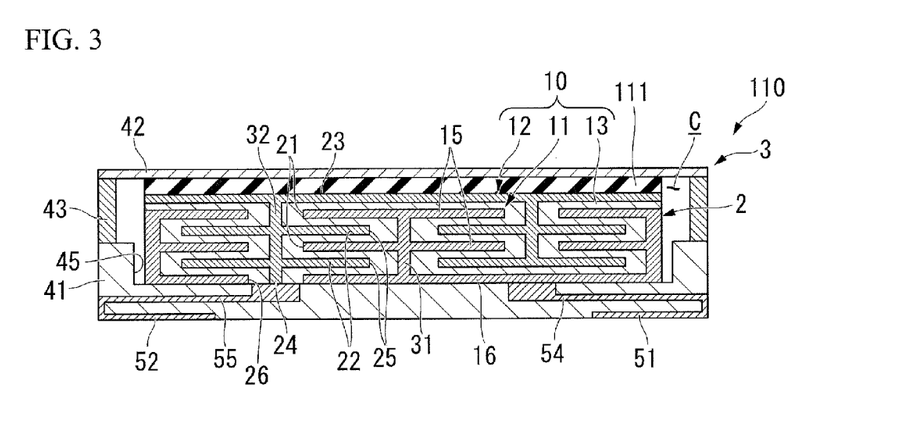
FIG. 3 is a view showing a secondary battery according to a modification example of the second embodiment of the invention as a cross-sectional view corresponding to FIG. 1.

FIG. 3 is a view showing a secondary battery 110 according to a modification example of the second embodiment, and is a cross-sectional view corresponding to FIG. 1.

In the secondary battery 110 shown in FIG. 3, an insulating material 111 is provided without a gap between the upper surface of the electrode body 2 and the lower surface of the lid substrate 42. In this modification example, the insulating material 111 is constituted by an elastically deformable material.

According to this configuration, the elastically deformable insulating material 111 is interposed between the lid substrate 42 and the electrode body 2. According to this, it is possible to mitigate a stress that is caused by a difference between a coefficient of thermal expansion of the electrode body 2 and a coefficient of thermal expansion of the exterior packaging body 3, and acts on the electrode body 2 and the exterior packaging body 3. In addition, the volume variation of the electrode body 2 in accordance with charging and discharging, or a tolerance of the electrode body 2 and the exterior packaging body 3 can be absorbed by the elastic deformation of the insulating material 111. As a result, it is possible to suppress occurrences of cracking in the electrode body 2 while securing insulation between the lid substrate 42 and the electrode body 2.

In the above-described embodiment, a description has been provided of a configuration in which the electrode body 2, which is baked in the hot pressing process, is bonded to the base substrate 41 via the conductive adhesive in the sealing process, but there is no limitation thereto. That is, in the hot pressing process, baking of the electrode body 2 (sheet stacked body) and bonding between the electrode body 2 and the base substrate 41 may be simultaneously performed.

In this case, it is possible to realize an improvement in manufacturing efficiency, and it is not necessary to use the conductive adhesive for bonding between the electrode body 2 and the base substrate 41, and thus it is also possible to reduce the material cost.

Third Embodiment

Figure 4:
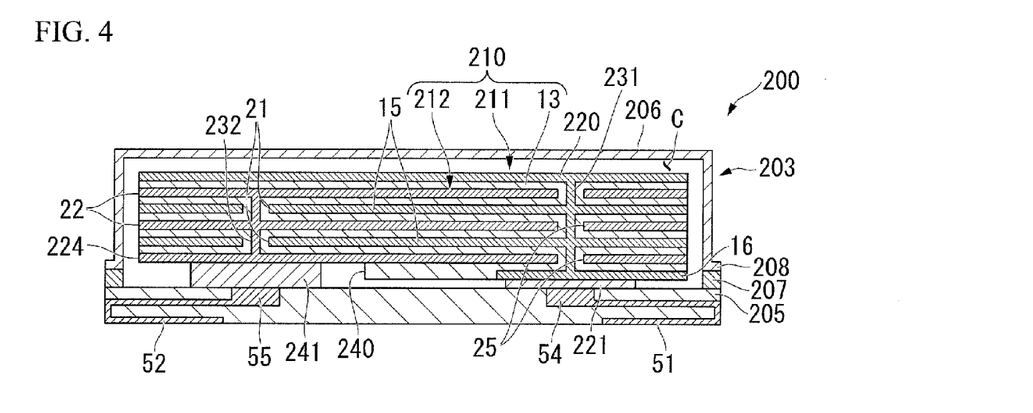
FIG. 4 is a view showing a secondary battery according to a third embodiment of the invention as a cross-sectional view corresponding to FIG. 1.

Next, a third embodiment of the invention will be described. FIG. 4 is a view showing a secondary battery 200 of the third embodiment, and is a cross-sectional view corresponding to FIG. 1.

In the secondary battery 200 shown in FIG. 4, a base substrate 205 of an exterior packaging body 203 is formed in a flat plate shape. Through-electrodes 54 and 55, which penetrate through the base substrate 205 in the stacking direction, are formed in the base substrate 205. The through-electrodes 54 and 55 are exposed on an upper surface of the base substrate 205. The positive electrode through-electrode 54 is connected to the positive electrode external electrode 51 on a lower surface of the base substrate 205. The negative electrode through-electrode 55 is connected to the negative electrode external electrode 52 on the lower surface of the base substrate 205.

In a lid substrate 206, a shape in a cross-sectional view along the stacking direction is a hat type. The lid substrate 206 surrounds an upward side and a lateral side of an electrode body 210. The lid substrate 206 includes a flange portion 208 that protrudes from a lower end opening edge to an outer side. A lower surface of the flange portion 208 is joined to the upper surface of the base substrate 205 via a joining film 207. In this embodiment, the flange portion 208 is jointed onto the base substrate 205 through baking of a brazing material such as a silver solder, a soldering material, and the like. According to this, the above-described cavity C is air-tightly sealed.

In an electrode body 210, a positive electrode layer 211 includes a positive electrode connection layer 15, a positive electrode current collector layer 16, and a positive electrode exposure layer 220 that is exposed at the uppermost layer of the electrode body 210. The positive electrode connection layer 15, the positive electrode current collector layer 16, and the positive electrode exposure layer 220 are connected in parallel to each other via a positive electrode via 231. The positive electrode via 231 of this embodiment is formed at a position that is not exposed on an outer peripheral surface of the electrode body 210.

The positive electrode current collector layer 16 is mounted on the positive electrode through-electrode 54 via a positive electrode conductive member 221. The positive electrode conductive member 221 is formed from conductive paste.

A negative electrode layer 212 includes a negative electrode connection layer 22 and a negative electrode current collector layer 224. The negative electrode connection layer 22 and the negative electrode current collector layer 224 are connected in parallel to each other via a negative electrode via 232. The negative electrode via 232 of this embodiment is formed at a position that is not exposed on the outer peripheral surface of the electrode body 210.

The negative electrode current collector layer 224 is located at the lowest layer in the negative electrode layer 212. Specifically, the negative electrode current collector layer 224 is stacked on an upward side of the positive electrode current collector layer 16 in the electrode body 210 via the solid electrolyte layer 13. A part of the negative electrode current collector layer 224 is exposed to an outer side (downward side) through an exposure hole 240 that is formed on a lower surface of the electrode body 210. In the negative electrode current collector layer 224, a portion, which is exposed through the exposure hole 240, is mounted on the negative electrode through-electrode 55 via a negative electrode conductive member 241. The negative electrode conductive member 241 is formed form conductive paste. The thickness of the negative electrode conductive member 241 is set to be greater than that of the positive electrode conductive member 221.

Even in this embodiment, it is possible to mount the current collector layers 16 and 224 of the electrode body 210 in the exterior packaging body 3 on a lower surface side of the electrode body 210. According to this, it is possible to exhibit the same operational effect as in the above-described embodiments.

The positive electrode current collector layer 16, and a portion that is exposed to an outer side in the negative electrode current collector layer 224 are disposed via a step difference corresponding to the thickness of the solid electrolyte layer 13 that is located at the lowest layer of the electrode body 210. According to this, the current collector layers 16 and 224 can be spaced away from each other, and thus it is possible to suppress short-circuiting between the positive electrode layer 211 and the negative electrode layer 212.

In this embodiment, the current collector layers 16 and 224 can be spaced away from each other in an in-plane direction, an thus it is easy to perform alignment between the positive electrode current collector layer 16 and the positive electrode through-electrode 54, and alignment between the negative electrode current collector layer 224 and the negative electrode through-electrode 55.

In this embodiment, the positive electrode current collector layer 16 is mounted via the positive electrode conductive member 221, and the negative electrode current collector layer 224 is mounted via the negative electrode conductive member 241. According to this, it is possible to improve mounting strength of the electrode body 210.

In addition, the conductive members 221 and 241 function as a buffer layer, and thus it is possible to improve cycle characteristics of the electrode body 210.

Fourth Embodiment

Figure 5:
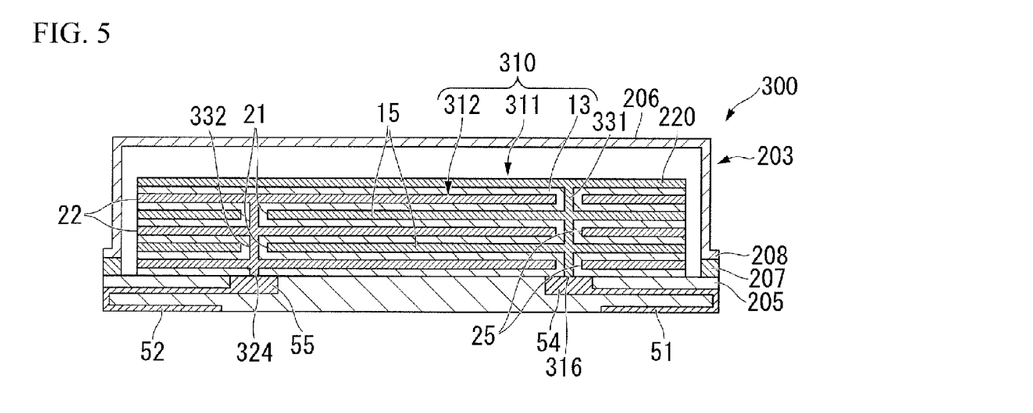
FIG. 5 is a view showing a secondary battery according to a fourth embodiment of the invention as a cross-sectional view corresponding to FIG. 1.

Next, a fourth embodiment of the invention will be described. FIG. 5 is a view showing a secondary battery 300 according to the fourth embodiment, and is a cross-sectional view corresponding to FIG. 1.

In the secondary battery 300 shown in FIG. 5, a positive electrode current collector layer 316 of an electrode body 310 (positive electrode layer 311) is exposed on a lower surface of the electrode body 310 through the solid electrolyte layer 13 that is located at the lowest layer of the electrode body 310.

A negative electrode current collector layer 324 of a negative electrode layer 312 is exposed on the lower surface of the electrode body 310 through the solid electrolyte layer 13 that is located at the lowest layer of the electrode body 310. Furthermore, outer diameters of the current collector layers 316 and 324 are set to be the same as external diameters of vias 331 and 332.

Even in this embodiment, it is possible to exhibit the same operational effect as in the above-described embodiments.

Particularly, in this embodiment, the current collector layers 316 and 324 can be spaced away from each other in an in-plane direction. Accordingly, it is possible to suppress short-circuiting between the positive electrode layer 311 and the negative electrode layer 312, and it is easy to perform alignment between the positive electrode current collector layer 316 and the positive electrode through-electrode 54, and alignment between the negative electrode current collector layer 324 and the negative electrode through-electrode 55.

Figure 6:
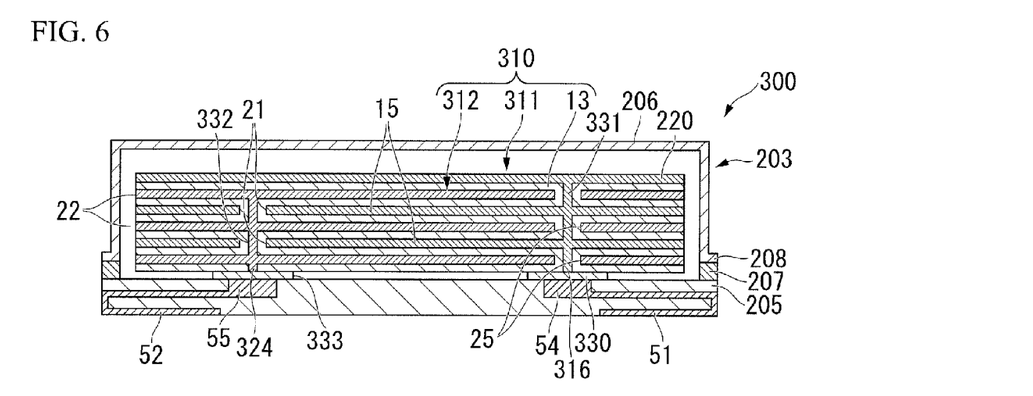
FIG. 6 is a view showing a secondary battery according to a modification example of the fourth embodiment of the invention as a cross-sectional view corresponding to FIG. 1.

As shown in FIG. 6, a positive electrode conductive member 330 (for example, conductive paste, copper foil, aluminum foil, and the like) may be interposed between the positive electrode current collector layer 316 and the positive electrode through-electrode 54. A negative electrode conductive member 331 (for example, conductive paste, copper foil, aluminum foil, and the like) may be interposed between the negative electrode current collector layer 324 and the negative electrode through-electrode 55.

According to the configuration as shown in FIG. 6, it is possible to exhibit the same operational effect as in the fourth embodiment. According to the configuration as shown in FIG. 6, the positive electrode current collector layer 316 is mounted via the positive electrode conductive member 330, and the negative electrode current collector layer 324 is mounted via the negative electrode conductive member 333, and thus it is possible to improve the mounting strength of the electrode body 310.

In addition, the conductive members 330 and 333 function as a buffer layer, it is possible to improve cycle characteristics of the electrode body 310.

Hereinbefore, the preferred embodiments of the present invention have been described, but the present invention is not limited to the embodiments. Addition, omission, substitution, and other modifications of configurations may be made within a range not departing from the gist of the present invention. The present invention is not limited by the above description, and is limited only a range of the attached claims.

For example, in the above-described embodiments, a description has been provided of a secondary battery as an example of the electrochemical cell, but a capacitor or a primary battery is also possible. Materials which are used in the positive electrode layer, the negative electrode layer, and the solid electrolyte layer, the stacking number of the positive electrode layer or the negative electrode layer, a layout of the current collector layer in a plan view, a layout of the via, and the like can be appropriately changed. In the above-described embodiments, the layout of the positive electrode layer and the layout of the negative electrode layer can be substituted with each other.

The configuration of the exterior packaging body 3 can be appropriately changed as long as the electrode body 2 can be sealed. In this case, for example, in the above-described embodiments, a description has been provided of a configuration in which the base substrate 41 is provided with the concave portion 45, but the base substrate 41 may have a flat plate shape without limitation to the configuration.

In the above-described embodiments, a description has been provided of a configuration in which the base substrate 41 and the lid substrate 42 are joined to each other via the seal ring 43, but a configuration, in which the base substrate 41 and the lid substrate 42 is directly joined to each other, may be employed.

In the above-described embodiments, a description has been provided of a case where a so-called ceramic package, in which at least one of the base substrate 41 and the lid substrate 42 is formed from a ceramic material, is applied to the exterior packaging body 3, and there is no limitation thereto.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed:

1. An all-solid-state electrode body, comprising:
a stacked body in which a positive electrode connection layer and a negative electrode connection layer are alternately stacked in a first direction via a solid electrolyte;
a positive electrode via which extends on an inner side of the stacked body in a first direction through a negative electrode escape portion that is formed in the negative electrode connection layer, and connects a plurality of the positive electrode connection layers adjacent to each other in the first direction;
a negative electrode via which extends on an inner side of the stacked body in the first direction through a positive electrode escape portion that is formed in the positive electrode connection layer, and connects a plurality of the negative electrode connection layers adjacent to each other in the first direction;
a positive electrode current collector layer which is exposed on a first surface that faces one side of the first direction in the stacked body, and is connected to the positive electrode connection layer via the positive electrode via; and
a negative electrode current collector layer which is exposed on the first surface in the stacked body, and is connected to the negative electrode connection layer via the negative electrode via.

2. The all-solid-state electrode body according to claim 1, wherein a plurality of the positive electrode current collector layers and a plurality of the negative electrode current collector layers are exposed on the first surface with an interval in an in-plane direction that is perpendicular to the first direction.

3. An electrochemical cell, comprising:

the all-solid-state electrode body according to claim 1;

an exterior packaging body having a cavity in which the all-solid-state electrode body is accommodated;

a positive electrode through-electrode which conducts an inner side and an outer side of the exterior packaging body and is exposed on a first inner surface, which faces the first surface of the all-solid-state electrode body in the first direction, in the exterior packaging body, and to which the positive electrode current collector layer is connected on the first inner surface; and a negative electrode through-electrode which conducts an inner side and an outer side of the exterior packaging body and is exposed on the first inner surface, and to which the negative electrode current collector layer is connected on the first inner surface.

4. The electrochemical cell according to claim 3, wherein an insulating material is disposed between a second surface that faces the other side of the first direction in the all-solid-state electrode body, and a second inner surface, which faces the second surface of the all-solid-state electrode body in the first direction, in the exterior packaging body.

5. The electrochemical cell according to claim 4, wherein the insulating material is configured to be elastically deformable, and is disposed to come into close contact with the second surface of the all-solid-state electrode body and the second inner surface of the exterior packaging body.

\* \* \* \* \*